(12) United States Patent
Ebert

(10) Patent No.: US 11,945,260 B2
(45) Date of Patent: Apr. 2, 2024

(54) TAPERED REPLACEMENT SPINDLE AND SEAL RING ASSEMBLIES

(71) Applicant: James L. Ebert, Huron, OH (US)

(72) Inventor: James L. Ebert, Huron, OH (US)

(73) Assignee: James L. Ebert, Huron, OH (US)

( * ) Notice: Subject to any disclaimer, the term of this patent is extended or adjusted under 35 U.S.C. 154(b) by 529 days.

(21) Appl. No.: 17/091,274

(22) Filed: Nov. 6, 2020

(65) Prior Publication Data
US 2021/0053396 A1 Feb. 25, 2021

Related U.S. Application Data

(63) Continuation-in-part of application No. 15/939,931, filed on Mar. 29, 2018, now Pat. No. 10,828,935.

(51) Int. Cl.
*B60B 35/18* (2006.01)
*F16J 15/34* (2006.01)

(52) U.S. Cl.
CPC .............. *B60B 35/18* (2013.01); *F16J 15/348* (2013.01); *B60B 2310/302* (2013.01); *B60B 2380/774* (2013.01)

(58) Field of Classification Search
CPC ......... B60B 35/18; B60B 35/14; B60B 35/04; B60B 35/08
See application file for complete search history.

(56) References Cited

U.S. PATENT DOCUMENTS

| | | | |
|---|---|---|---|
| 5,966,812 A | 10/1999 | Shiets | |
| 6,024,418 A | 2/2000 | Ebert | |
| 7,066,690 B2 | 6/2006 | Ebert | |
| 8,939,518 B2 | 1/2015 | Ebert | |
| 10,202,002 B2 | 2/2019 | Carroll | |
| 10,828,935 B2 * | 11/2020 | Ebert | B60B 35/14 |
| 10,850,562 B1 * | 12/2020 | Heft | B60B 35/163 |

* cited by examiner

*Primary Examiner* — Jason R Bellinger
(74) *Attorney, Agent, or Firm* — Vivacqua Crane PLLC

(57) ABSTRACT

A tractor or trailer axle replacement spindle and seal ring assembly includes a spindle with an elongate cylindrical body having bearing surfaces and threads. The seal ring is a shorter cylindrical component having an opening sized to achieve an interference fit with the spindle. The exterior surface of the spindle and the interior surface of the ring seal include complementary oblique, shoulders bounded by regions of constant diameter. The spindle also includes a shoulder or flange at its end opposite the threads which positively axially locates the seal ring thereon. When the two components are to be assembled, the seal ring is heated to several hundred degrees Fahrenheit and slid onto the spindle until the seal ring contacts the shoulder or flange on the spindle.

19 Claims, 9 Drawing Sheets

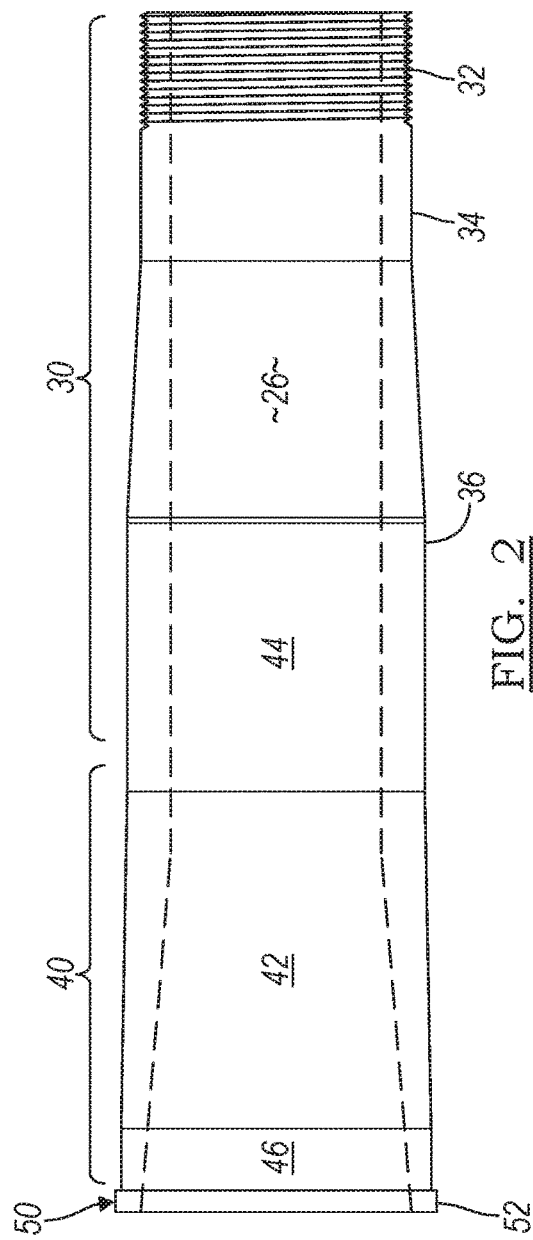
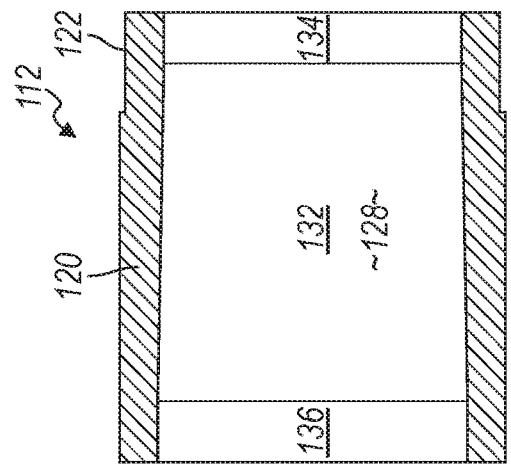
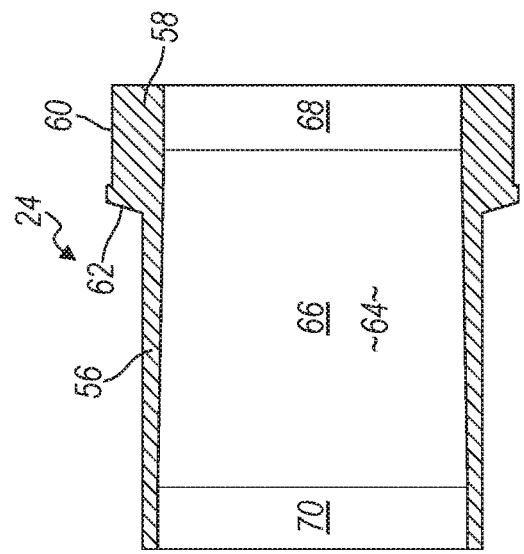

TAPERED REPLACEMENT SPINDLE AND SEAL RING ASSEMBLIES

CROSS REFERENCE TO RELATED APPLICATION

This patent application is a continuation-in-part of U.S. patent application Ser. No. 15/939,931 filed Mar. 29, 2018, now U.S. Pat. No. 10,828,935 granted Nov. 10, 2020.

FIELD

The present disclosure relates to replacement spindle and seal ring assemblies for installation in tractor and trailer axles and more particularly to replacement spindle and seal ring assemblies for tractor and trailer axles having complementarily tapered outer and inner surfaces.

BACKGROUND

The statements in this section merely provide background information related to the present disclosure and may or may not constitute prior art.

My U.S. Pat. No. 6,024,418 granted on Feb. 15, 2000 relates to an early axle spindle assembly and method for repairing axles of tractors and trailers. The spindle assembly comprised an elongate spindle and a sleeve or liner which was received in the open end of the axle from which a damaged portion had been removed. The sleeve or liner is assembled on the spindle and this assembly is inserted into the axle and secured by welds including plug welds extending through the axle and into the liner. This two piece assembly was necessary because one spindle diameter was utilized with one of a plurality of different diameter sleeves or liners to accommodate different axle diameters—the alternative being a plurality of specific sizes of spindle and liner assemblies that would greatly increase parts inventory and manufacturing expense.

In order to facilitate both ready installation of the replacement spindle in the axle and ensure an optimally secure fit, it was suggested that the axle be heated before the replacement spindle and liner were installed. Over time, the benefits of a heated, interference fit between the spindle and the liner were acknowledged and appreciated. Subsequently, the outside diameter of the spindle and the inside diameter of the liner of an assembly were sized to provide an interference fit of several thousandths of an inch. In order to assemble them, the liner was heated several hundred degrees Fahrenheit and slid into position on the spindle where it rapidly cooled and became lodged.

While this interference fit provided a remarkably secure connection between the spindle and the liner, an error during assembly could cause the liner to secure itself to the spindle in an incorrect axial position or skewed orientation. Re-heating only the liner in order to expand it and re-position it on the spindle, without heating and expanding the spindle, proved to be exceedingly difficult. Stated somewhat differently, once the liner cooled and contracted about the spindle, it was generally acknowledged that nothing short of sawing the liner into two pieces would accomplish its removal from the spindle.

Thus, I sought to develop a structure and method which would provide the benefits of an interference fit between the spindle and associated components without the assembly issues currently experienced.

SUMMARY

The present invention provides a tractor or trailer axle replacement spindle and seal ring assembly having complementarily tapered portions and an interference fit which can be heated and readily, accurately and correctly assembled. The spindle is an elongate cylinder with bearing surfaces and a threaded end. The seal ring is a shorter cylindrical component having a circular opening sized to achieve an interference fit with the spindle. The exterior surface of the spindle and the interior surface of the seal ring include complementary oblique shoulders or surfaces. Extending away from each of the oblique steps or surfaces of the spindle and seal ring are regions of constant diameter. The spindle also includes a shoulder or flange at its end opposite the threads which positively axially locates or positions the seal ring thereon. When the two components are to be assembled, the seal ring is heated to several hundred degrees Fahrenheit and slid onto the spindle until it contacts the shoulder or flange of the spindle. The oblique surfaces or shoulders, however, do not contact one another. The seal ring rapidly cools and a tight interference fit is established between the seal ring and the spindle. The spindle assembly is then inserted into an open end of the axle and secured there by circular welds between the axle and the seal ring as well as one or more plug welds between the axle and the inner end of the seal ring.

Thus it is an aspect of the present invention to provide an improved replacement spindle and seal ring assembly for tractor and trailer axles.

It is a further aspect of the present invention to provide an improved replacement spindle and seal ring assembly for tractor and trailer axles having an interference fit between the replacement spindle and seal ring.

It is a still further aspect of the present invention to provide an improved replacement spindle and seal ring assembly for tractor and trailer axles having an oblique shoulder on the outside surface of the spindle and the inside surface of the seal ring.

It is a still further aspect of the present invention to provide an improved replacement spindle and seal ring assembly for tractor and trailer axles having an oblique shoulder on the outside surface of the spindle which is disposed between two regions of constant diameter.

It is a still further aspect of the present invention to provide an improved replacement spindle and seal ring assembly for tractor and trailer axles having an oblique shoulder on the inside surface of the seal ring which is disposed between two regions of constant diameter.

It is a still further aspect of the present invention to provide an improved replacement spindle and seal ring assembly for tractor and trailer axles having a shoulder which limits axial translation of the seal ring.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a side, elevational view of a first embodiment of a replacement spindle according to the present invention;

FIG. 3 is a full, sectional view of a first embodiment of a seal ring according to the present invention;

FIG. 5 is a full, sectional view of a second embodiment of a seal ring according to the present invention;

DETAILED DESCRIPTION

The following description is merely exemplary in nature and is not intended, and should not be construed, to limit the present disclosure, application, or uses in any way.

Figure 1:
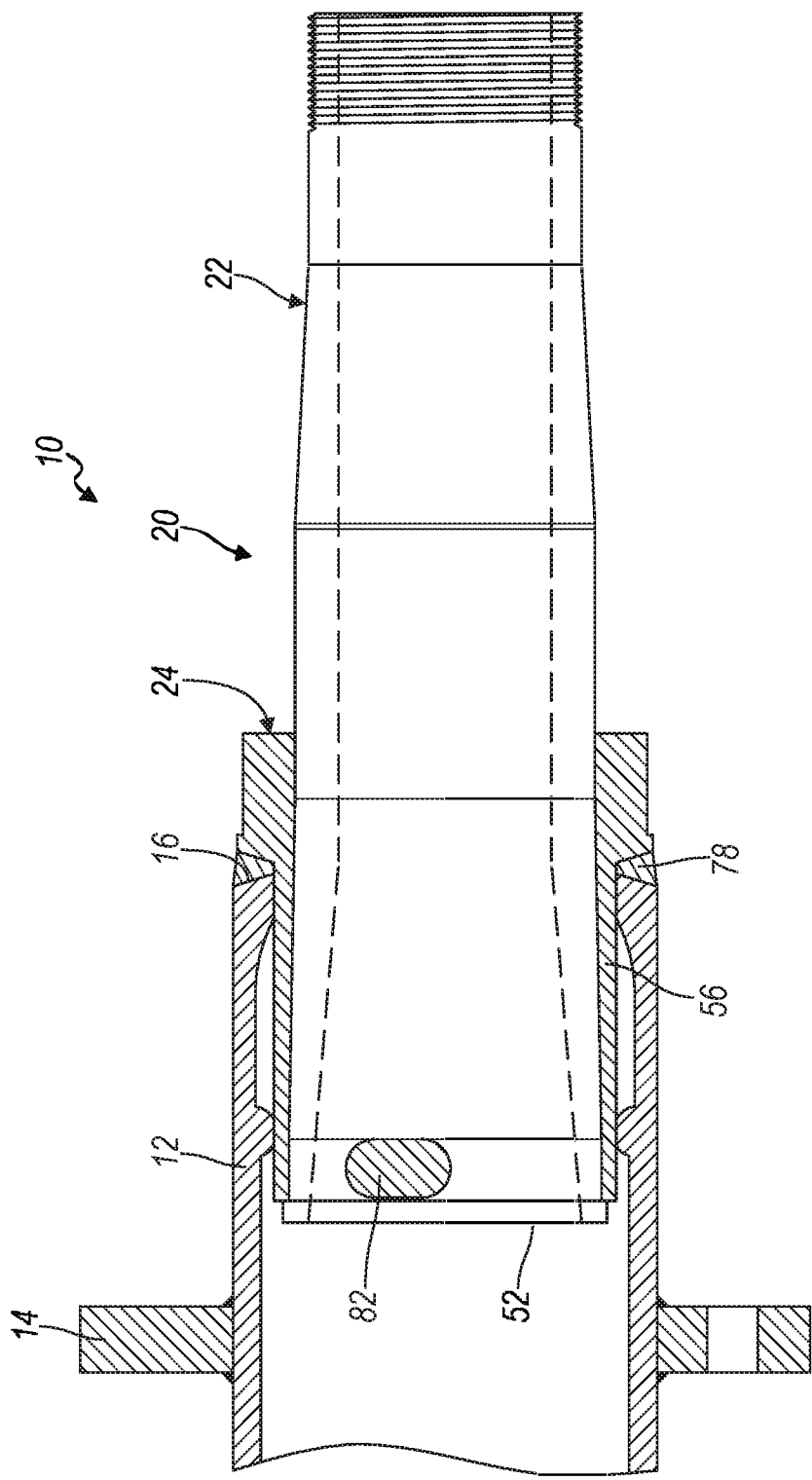
FIG. 1 is a full, sectional view of a first embodiment of a replacement spindle and seal ring assembly according to the present invention mounted in an axle.

With reference to FIG. 1, a repaired and functional tractor or drive axle spindle assembly incorporating the present invention is illustrated and generally designated by the reference number 10. The functional drive axle spindle assembly 10 includes a terminal adjacent portion of the vehicle axle 12 which includes a brake flange 14 to which vehicle brake components (not illustrated) are attached and a first embodiment of a replacement spindle assembly 20. In accordance with procedures described in my above-referenced patent, a worn or damaged end portion (not illustrated) of the vehicle axle 12, typically including at least both inner and outer bearing surfaces and the threaded terminal portion, has been removed and an end surface 16 of the vehicle axle 12 has been machined or ground to a reasonably smooth chamfered finish, having an angle of between approximately 20 and 25 degrees to the axle axis, and preferably 22.5 degrees.

Referring now to FIGS. 2 and 3, the first embodiment of a replacement spindle assembly 20 includes an elongate, cylindrical spindle 22 and an annular seal ring 24 which fits on and achieves an interference fit with the spindle 22. The spindle 22 defines a first (outer) end portion or region 30, an intermediate portion or region 40 and a second (inner) end portion or region 50. The elongate, cylindrical spindle 22 is preferably, though not necessarily, hollow and defines a through axial opening or passageway 26. Such an opening or passageway 26 is advantageous in that it achieves significant weight reduction relative to a solid spindle. Moreover, if the axle 12 is a drive axle of a tractor, it will necessarily be hollow to receive a drive shaft (not illustrated).

The first end portion or region 30 include male threads 32 at its terminus, a first, outer bearing surface 34 and an axially spaced apart second, inner bearing surface 36. Generally speaking, and as illustrated in FIGS. 1 and 2, the diameter of the outer bearing surface 34 is smaller than the diameter of the inner bearing surface 36. Certain axles, however, have inner and outer bearing surfaces of the same diameter and it should be understood that the present invention is equally suitable for use with both configurations.

The intermediate portion or region 40 of the spindle 22 preferably includes three distinct regions or surfaces. A first, tapered or frusto-conical center region or surface 42 has a first, smallest diameter at its end more proximate the first end portion 30 of the spindle 22 and a second, largest diameter at its end more proximate the second end portion 50 of the spindle 22. The taper is slight, significantly less than 1 degree, and amounts to between approximately 0.001 to 0.003 inches per axial inch. (A taper of 0.0035 inches per inch is an angle of 0.2 degrees or 12 minutes.) The frusto-conical center surface 42 may merge with or be bounded at both ends by two annular bands or surfaces of constant diameter. At the end of the frusto-conical center region or surface 42 proximate the first end portion 30 of the spindle 22 may be a first annular band or surface 44 having a diameter equal to the smallest diameter of the frusto-conical center surface 42. At the end of the frusto-conical center region or surface 42 proximate the second end portion 50 of the spindle 22 may be a second annular band or surface 46 having a diameter equal to the largest diameter of the frusto-conical center surface 42.

It should be appreciated and understood, first of all, that the first and second annular surfaces 44 and 46 exist primarily to facilitate accurate measurement of the diameters of the adjacent ends of the frusto-conical center surface 42 and thus that they are optional features of the spindle 22 and, second of all, that the widths of the surfaces 42, 44 and 46 may vary widely. For example, and notwithstanding the configuration of the spindle 22 illustrated in FIG. 2, one or both of the surfaces 44 and 46, if included, may occupy greater axial length, with the center surface 42 occupying a smaller center region or vice versa.

The second annular surface 46 is also adjacent the second end portion or region 50 of the spindle 22 which may include a shoulder or flange 52. If included, the shoulder or flange 52 preferably extends circumferentially around the spindle 22 and functions as an axial stop or travel limit for the seal ring 24, as will be explained subsequently. In the first embodiment, the shoulder or flange 52 represents the inner terminus of the spindle 22.

As illustrated in FIGS. 1 and 3, the seal ring 24 is received on the spindle 22 and facilitates secure installation of the spindle 22 in the vehicle axle 12. The seal ring 24 defines a short annular or cylindrical body 56 having an enlarged diameter region or collar 58 at one end. A circumferential surface 60 of the collar 58 provides an oil seal surface which is contacted by an elastomeric seal (not illustrated) disposed on the wheel hub (also not illustrated) which seals in lubricant and seals out contaminants and foreign matter. The collar 58 also includes an oblique surface 62 oriented at an angle of between approximately 20 and 25 degrees and preferably at 22.5 degrees. The seal ring 24 includes a through opening 64 which defines three distinct regions or surfaces which are complementary to the three distinct regions or surfaces on the intermediate portion or region 40 of the spindle 22. As such, it includes a tapered or frusto-conical center region or surface 66 having its smallest diameter proximate the collar 58 of the seal ring 24 and its largest diameter distant the collar 58.

At the end of the frusto-conical center surface 66 proximate the collar 58 may be a first, smaller annulus or band 68 of constant diameter the same as the diameter of the adjacent end of the frusto-conical center surface 66. At the end of the frusto-conical center surface 66 distant the collar 58 may be a second, larger annulus or band 70 of constant diameter the same as the diameter of the adjacent end of the frusto-conical center surface 66. In FIG. 3, the angle of the taper of the center surface 66 has been enhanced to improve the clarity of and facilitate understanding of this feature of the invention. The axial length of the center surface 66, its taper angle and the axial lengths of the bands 68 and 70 are identical to the axial length and taper angle of the frusto-conical center surface 42 of the spindle 22 and the axial lengths of the annular surfaces 44 and 46 such that the respective surfaces align when the seal ring 24 is positioned on the spindle 22.

Again, it should be appreciated and understood, first of all, that the first and second annuli 68 and 70 exist primarily to facilitate accurate measurement of the diameters of the adjacent ends of the frusto-conical center surface 66 and thus that they are an optional feature of the seal ring 24 and, second of all, that the widths (axial lengths) of the center surface 66 and the first and second annuli 68 and 70 may vary widely, but must, of course, respectively be identical to the widths (axial lengths) of the frusto-conical surface 42 and the annular surfaces 44 and 46 of the spindle 22. For example, and notwithstanding the configuration of the seal ring 24 illustrated in FIG. 3, one or both of the annuli 68 and 70, if included, may occupy greater axial length, with the center surface 66 occupying a smaller (narrower) center region or vice versa.

In order to achieve a suitable interference fit after heating and assembly, the frusto-conical center surface 66 and the first and second annuli 68 and 70 of the seal ring 24 will typically and preferably define diameters between approximately 0.004 and 0.006 inches smaller than their mating tapered and annular surfaces 42, 44 and 46 of the spindle 22, or, stated oppositely, the frusto-conical surface 42 and the annular surfaces 44 and 46 of the spindle 22 will typically and preferably define diameters between 0.004 and 0.006 inches larger than the center surface 66 and the first and second annuli 68 and 70 of the seal ring 24 before assembly.

Upon installation into the vehicle axle 12 which may be bored to accommodate the spindle 22, a groove weld 78 is disposed between the end surface 16 of the vehicle axle 12 and the oblique surface 62 of the collar 58 of the seal ring 24. Also, one, a pair of horizontally opposed, i.e., located at 9:00 o'clock and 3:00 o'clock, or a plurality of plug welds 82, one of which is illustrated in FIG. 1, extend through the vehicle axle 12 and into the seal ring 24 to further secure the spindle assembly 20 into the vehicle axle 12.

Figure 4:
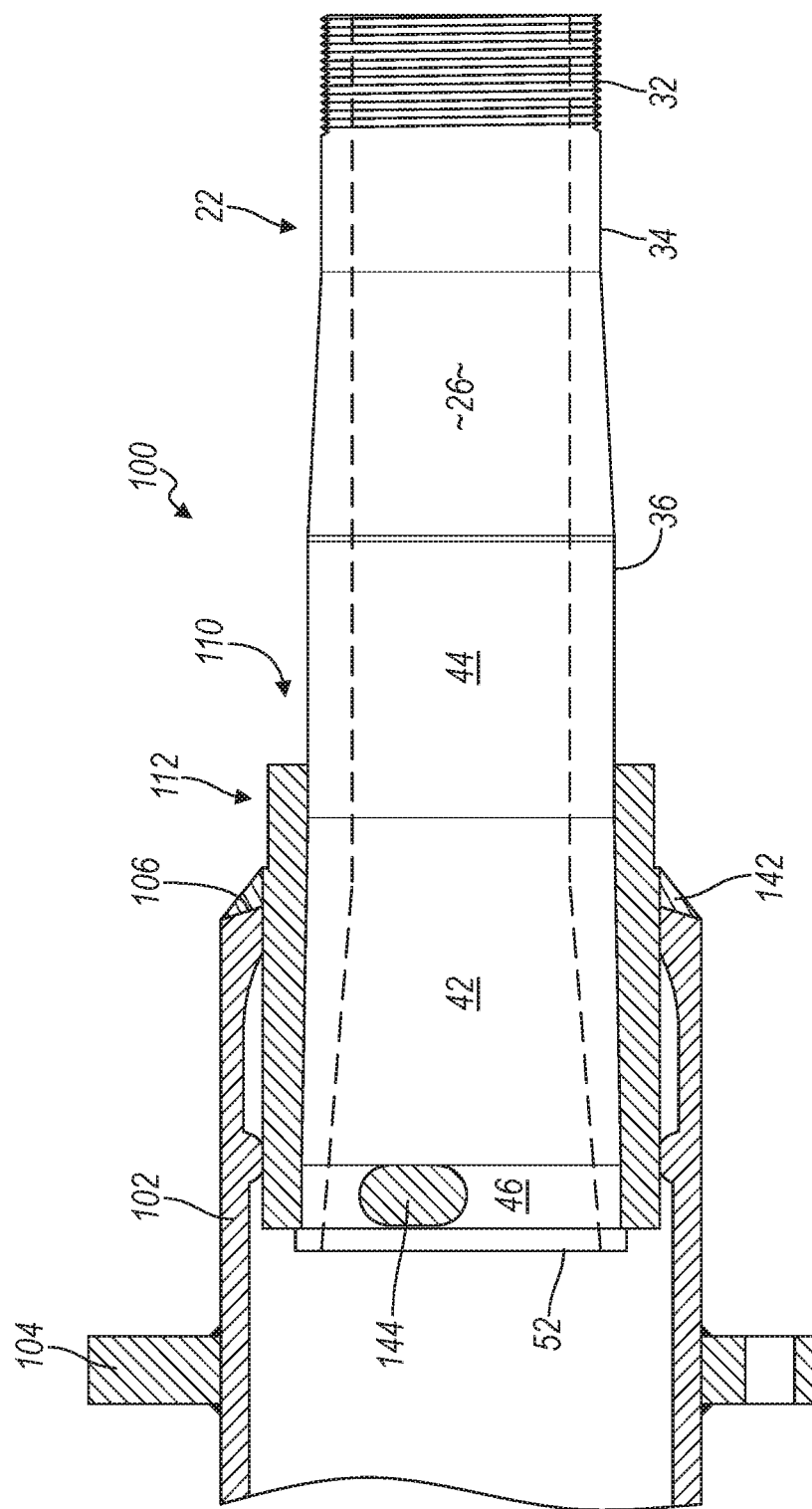
FIG. 4 is full, sectional view of a second embodiment of a replacement spindle and seal ring assembly according to the present invention mounted in an axle.

Referring now to FIG. 4, a second embodiment of a replacement spindle assembly mounted and secured in an axle is illustrated and generally designated by the reference number 100. Once again, the axle and spindle assembly 100 includes a terminal adjacent portion of a vehicle axle 102 which includes a brake flange 104 to which brake components (not illustrated) are attached and a replacement spindle assembly 110. The second embodiment replacement spindle assembly 110 is generally similar to the first embodiment spindle assembly 20 except that a larger seal ring is utilized to accommodate and better match a larger axle. Once again, a worn or damaged end portion (not illustrated) of the vehicle axle 102 has been removed and an end surface 106 of the vehicle axle 102 has been machined or ground to a reasonably smooth chamfered finish disposed at an angle of between approximately 20 and 25 degrees and preferably 22.5 degrees.

Referring now to FIGS. 2, 4 and 5, the second embodiment replacement spindle assembly 110 includes the elongate, cylindrical spindle 22 described above with reference to FIG. 2 and a second embodiment of an annular seal ring 112 which fits over and achieves an interference fit on the spindle 22. The elongate spindle 22 defines the first (outer) end portion or region 30, the intermediate portion or region 40 and the second (inner) end portion or region 50. Given considerations of weight and material savings, whether the spindle 22 is associated with a tractor axle or a trailer axle, it will preferably be fabricated with the through opening or passageway 26.

As described above, the spindle 22 includes the first end portion 30 having the male threads 32 at its terminus, the first, outer bearing surface 34 and the axially spaced apart second, inner bearing surface 36. As also stated above, while the diameter of the outer bearing surface 34 illustrated is smaller than the diameter of the inner bearing surface 36, it should be understood that the present invention may be utilized with axle configurations having inner and outer bearing surfaces of the same diameter.

The intermediate portion or region 40 of the spindle 22 may include three distinct regions or surfaces: the frusto-conical center region or surface 42 having the first, smallest diameter at the end proximate the first end portion 30 of the spindle 22 and the second, largest diameter at the end proximate the second end portion 50 of the spindle 22. The taper amounts to between approximately 0.001 and 0.003 inches per axial inch, which, as noted above, is an angle of 0.2 degrees or 12 minutes for a taper of 0.0035 inches per inch. The frusto-conical center surface 42 smoothly merges with and may be bounded at its end proximate the first end portion 30 of the spindle 22 by the first annular surface or band 44 having a diameter equal to the smallest diameter of the frusto-conical surface 42 and at its end proximate the second end portion 50 of the spindle 22 by the second annular surface or band 46 having a diameter equal to the largest diameter of the frusto-conical center surface 42.

Again, it should be understood that the first and second annular surfaces 44 and 46 exist primarily to facilitate accurate measurement of the diameters of the adjacent ends of the frusto-conical center surface 42. Thus they are optional. Moreover, the widths of the surfaces 42, 44 and 46 may vary widely. For example, and notwithstanding the configuration of the spindle 22 illustrated in FIG. 2, one or both of the surfaces 44 and 46, if included, may occupy greater axial length, with the center surface 42 occupying a smaller (narrower) center region or vice versa.

The second annular surface 46 is adjacent the second end portion or region 50 of the spindle 22 which may include the shoulder or flange 52. If present, the shoulder or flange 52 preferably extends fully around the spindle 22 and acts as an axial stop or translation limit for the seal ring 112.

Referring now to FIG. 5, the seal ring 112 defines a short annular or cylindrical body 120 having a reduced diameter region or inset shoulder 122 at one end. The reduced diameter region or inset shoulder 122 provides an oil seal surface which is contacted by an elastomeric seal (not illustrated) disposed on the wheel hub (also not illustrated) which seals in lubricant and seals out contaminants and foreign matter. The seal ring 112 includes a through opening 128 which defines a three region surface which is complementary to the intermediate portion or region 30 of the spindle 22. As such, it includes a tapered or frusto-conical center region or surface 132 having its smallest diameter region proximate the shoulder 122 of the seal ring 112 and its largest diameter region distant the shoulder 122.

At the end of the center region or surface 132 proximate the shoulder 122 may be a first, smaller annulus or band 134 of constant diameter which is the same diameter as the adjacent end of the center region or surface 132. At the end of the center region or surface 132 distant the collar 122 may be a second, larger annulus or band 136 of constant diameter which is the same diameter as the adjacent end of the center region or surface 132. In FIG. 5, the angle of the taper of the center surface 132 has been enhanced to improve the clarity of and facilitate understanding of this feature of the invention. The axial length of the center region or surface 132, its taper angle and the axial lengths of the bands 134 and 136 are identical to the axial length and taper angle of the center surface 42 of the spindle 22 and the axial lengths of the annular surfaces 44 and 46 such that the respective surfaces align when the seal ring 112 is positioned on the spindle 22.

Again, it should be appreciated that the first and second annuli 134 and 136 exist primarily to facilitate accurate measurement of the diameters of the adjacent ends of the frusto-conical center surface 132 and thus that they are optional. Furthermore, the widths (axial lengths) of the center surface 132 and the first and second annuli 134 and 136 may vary widely, but must, of course, respectively be identical to the widths (axial lengths) of the frusto-conical surface 42 and the annular surfaces 44 and 46 of the spindle 22. For example, and notwithstanding the configuration of the seal ring 112 illustrated in FIG. 5, the annuli 134 and 136 may occupy greater axial length, with the center surface 132 occupying a smaller (narrower) center region or vice versa.

In order to achieve a suitable interference fit after heating and assembly, the frusto-conical center surface 132 and the first and second annuli 134 and 136 of the seal ring 112 will typically and preferably define diameters between approximately 0.004 and 0.006 inches smaller than their mating annular surfaces 44 and 46 of the spindle 22, or, stated oppositely, the frusto-conical surface 42 and the annular surfaces 44 and 46 of the spindle 22 will typically and preferably define diameters between approximately 0.004 and 0.006 inches larger than the frusto-conical center surface 132 and the first and second annuli 134 and 136 of the seal ring 112 before assembly.

Upon installation into the vehicle axle 102 which may be bored to accommodate the spindle 22, a fillet weld 142 is disposed between the end surface 106 of the vehicle axle 102 and a region adjacent and inboard of the reduced diameter shoulder 122 of the seal ring 112. Also, one, a pair of horizontally opposed, i.e., located at 9:00 o'clock and 3:00 o'clock, or a plurality of plug welds 144, one of which is illustrated in FIG. 4, extend through the axle 102 and into the seal ring 112 to further secure the spindle assembly 110 into the vehicle axle 102.

Figure 6:
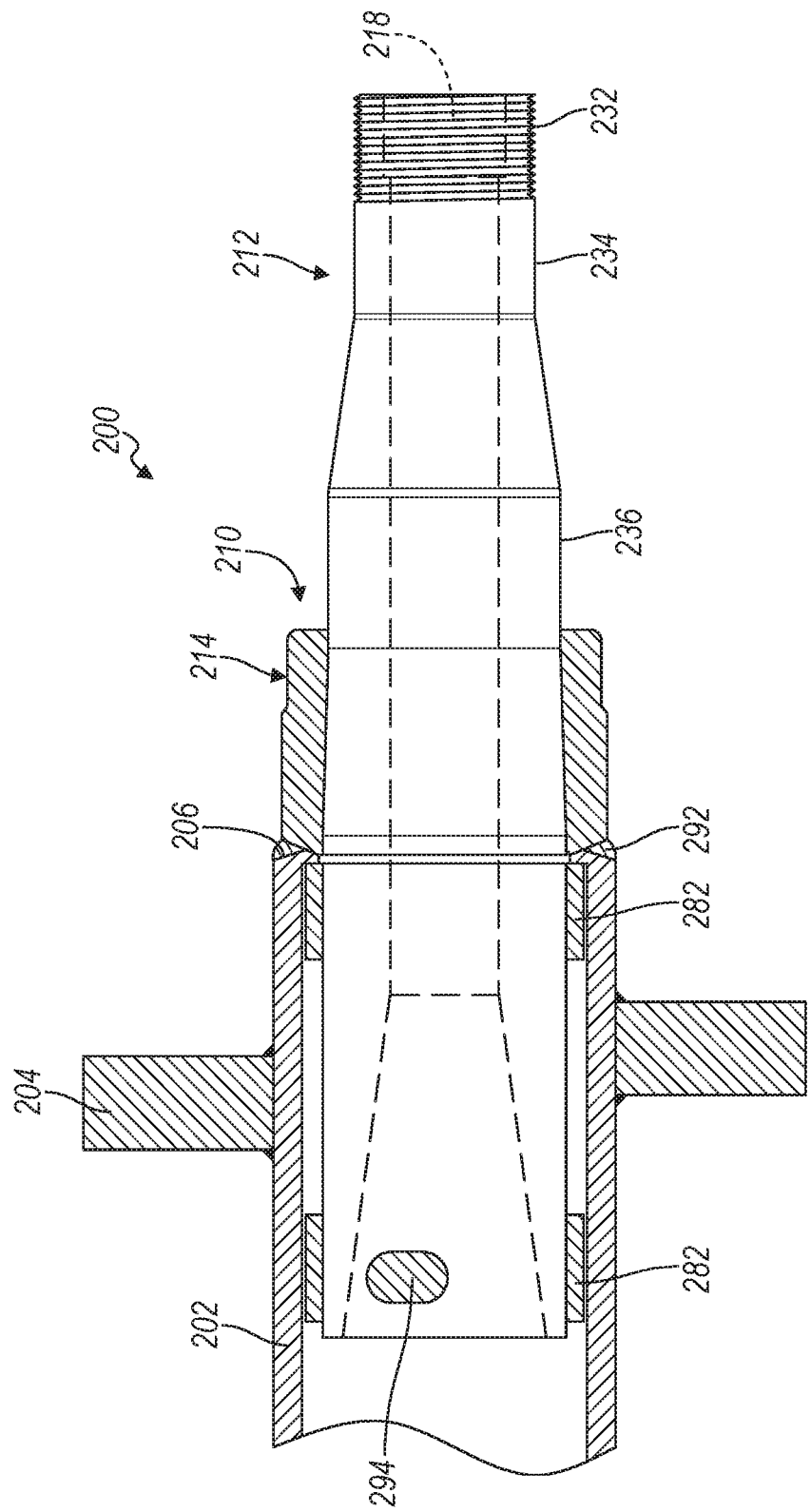
FIG. 6 is a full, sectional view of a third embodiment of a replacement spindle, seal ring and liner assembly according to the present invention mounted in an axle.

Referring now to FIG. 6, a third embodiment of a replacement spindle assembly mounted and secured in an axle is illustrated and generally designated by the reference number 200. The axle and spindle assembly 200 includes a terminal adjacent portion of a trailer axle 202 which includes a brake spider plate 204 to which trailer brake components (not illustrated) are attached and a replacement spindle assembly 210. The third embodiment of the replacement spindle assembly 200 is generally similar to the first embodiment 20 except that it is typically utilized with a trailer axle, includes a pair of liners and utilizes plug welds disposed behind the brake spider plate 204. Also once again, a worn or damaged end portion (not illustrated) of the axle 202 has been removed and an end surface 206 of the trailer axle 202 has been machined or ground to a reasonably smooth chamfered finish disposed at an angle of between approximately 20 and 25 degrees and preferably 22.5 degrees.

Figure 7:
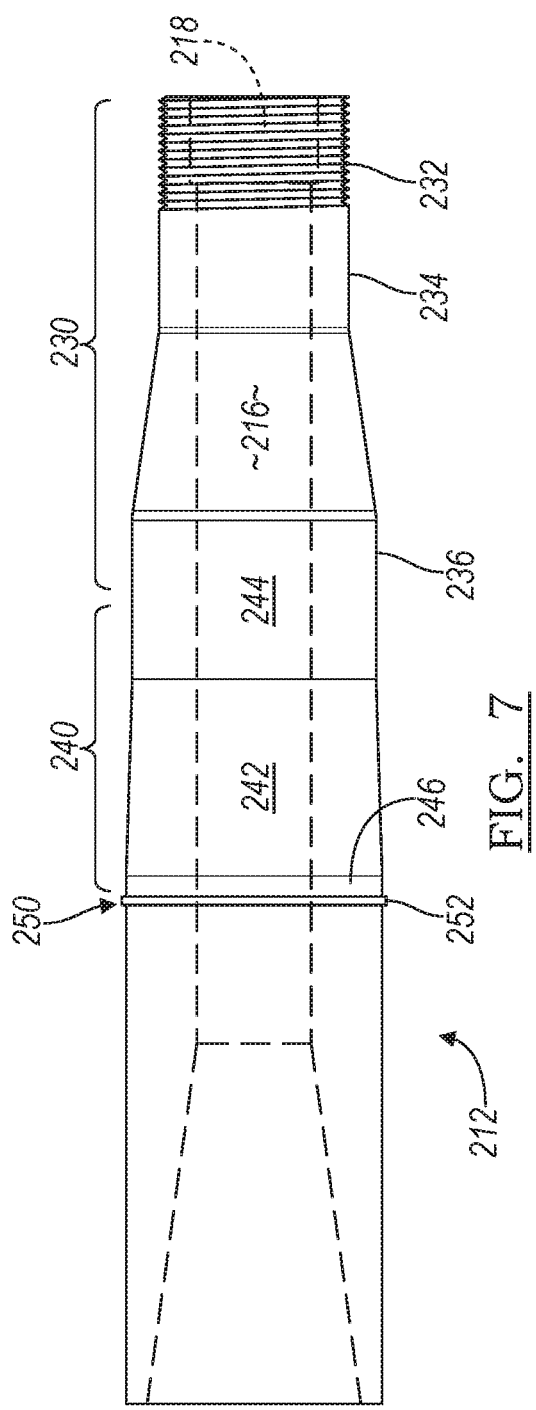
FIG. 7 is a side, elevational view of a third embodiment of a replacement spindle according to the present invention.
Figure 8:
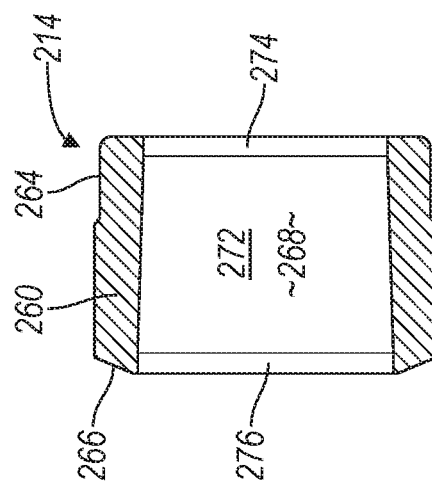
FIG. 8 is a full, sectional view of a third embodiment of a seal ring according to the present invention.

Referring now to FIGS. 6, 7 and 8, the third embodiment of the replacement spindle assembly 200 includes an elongate, cylindrical spindle 212 and an annular seal ring 214 which fits over and achieves an interference fit on the spindle 212. The elongate spindle 212, as does the first embodiment spindle 22, defines a first end portion or region 230, an intermediate portion or region 240 and a second end portion or region 250. Given considerations of weight and material savings, although the spindle 212 is associated with a trailer axle 202, it will preferably be fabricated with a through opening or passageway 216. In order to retain wheel bearing lubricant proximate the end of the spindle 212, a resilient, elastomeric plug 218 may be disposed in a recess at the end of the spindle 212.

The third embodiment spindle 212 includes the first end portion 230 having male threads 232 at its terminus, a first, outer bearing surface 234 and an axially spaced apart second, inner bearing surface 236. As stated above, while the diameter of the outer bearing surface 234 illustrated is smaller than the diameter of the inner bearing surface 236, it should be understood that the present invention may be utilized with axle configurations having inner and outer bearing surfaces of the same diameter.

The intermediate portion or region 240 of the spindle 212 may include three distinct regions or surfaces: a frusto-conical center region or surface 242 having a first, smallest diameter at the end proximate the first end portion 230 of the spindle 212 and a second, largest diameter at the end proximate the second end portion 250 of the spindle 212. The taper amounts to between approximately 0.001 and 0.003 inches per axial inch. The frusto-conical center surface 242 smoothly merges with and may be bounded at its end proximate the first end portion 230 of the spindle 212 by a first annular surface or band 244 having a diameter equal to the smallest diameter of the frusto-conical surface 242 and at its end proximate the second end portion 250 of the spindle 212 by a second annular surface or band 246 having a diameter equal to the largest diameter of the frusto-conical center surface 242.

Again, it should be understood that the first and second annular surfaces 244 and 246 exist primarily to facilitate accurate measurement of the diameters of the adjacent ends of the frusto-conical center surface 242. Thus they are optional. Moreover, the widths of the surfaces 242, 244 and 246 may vary widely. For example, and notwithstanding the configuration of the spindle 212 illustrated in FIG. 7, one or both of the surfaces 244 and 246, if included, may occupy greater axial length, with the center surface 242 occupying a smaller (narrower) center region or vice versa.

The second annular surface 246 is adjacent the second end portion or region 250 of the spindle 212 which may include a shoulder or flange 252. If present, the shoulder or flange 252 preferably extends fully around the spindle 212 and acts as an axial stop or translation limit for the annular seal ring 214.

Referring now to FIGS. 6 and 8, the annular seal ring 214 defines a short annular or cylindrical body 260 having a reduced diameter region or inset shoulder 264 at one end. The reduced diameter region or inset shoulder 264 of the seal ring 214 provides an oil seal surface which is contacted by an elastomeric seal (not illustrated) disposed on the wheel hub (also not illustrated) which seals in lubricant and seals out contaminants and foreign matter. The seal ring 214 also includes an oblique surface 266 oriented at between approximately 20 and 25 degrees and preferably at 22.5 degrees. The seal ring 214 includes a through opening 268 which may define a three region surface which is complementary to the intermediate portion or region 240 of the trailer spindle 212. As such, it includes a tapered or frusto-conical center region or surface 272 having its smallest diameter region proximate the reduced diameter region 264 and its largest diameter region proximate the oblique surface 266.

At the end of the center region or surface 272 proximate the reduced diameter region 264 may be a first, smaller annulus or band of constant diameter 274 and at the end of the center region or surface 272 proximate the oblique surface 266 may be a second, larger annulus or band of constant diameter 276. As previously noted, in FIG. 8, the angle of the taper of the center surface 272 has been enhanced to improve the clarity of and facilitate understanding of this feature of the invention. The axial length of the center surface 272, its taper angle and the axial lengths of the annuli or bands 274 and 276 are identical to the axial length and taper angle of the center surface 242 of the spindle 212 and the axial lengths of the annular surfaces 244 and 246 such that the respective surfaces align when the annular seal ring 214 is positioned on the spindle 212. In this regard, note that the annulus or band 276 is narrower than the corresponding feature of, for example, the seal ring 24 illustrated in FIG. 3, but that its width matches the narrow second annular surface 246 on the spindle 212.

Again, it should be understood that the first and second annuli 274 and 276 are included primarily to facilitate accurate measurement of the diameters of the adjacent ends of the frusto-conical center surface 272. Thus they are optional. Furthermore, the relative widths (axial lengths) of the center surface 272 and the first and second annuli 274 and 276 may vary widely, but must, of course, be identical, respectively, to the widths (axial lengths) of the frusto-conical surface 242 and the annular surfaces 244 and 246 of the spindle 212. For example, and notwithstanding the configuration of the seal ring 214 illustrated in FIG. 8, if one or both of the annuli 274 and 276 are utilized, they may occupy greater axial length, with the frusto-conical center surface 272 occupying a smaller (narrower) center region or vice versa.

In order to achieve a suitable interference fit after heating and assembly, the frusto-conical center surface 272 and the first and second annuli 274 and 276 of the seal ring 214 will typically and preferably define diameters between approximately 0.004 and 0.006 inches smaller than their mating frusto-conical center surface 242 and the annular surfaces 244 and 246 of the trailer spindle 212, or, stated oppositely, the frusto-conical center surface 242 and the annular surfaces 244 and 246 of the trailer spindle 212 will typically and preferably define diameters between approximately 0.004 and 0.006 inches larger than the frusto-conical center surface 272 and the first and second annuli 274 and 276 of the seal ring 214 before assembly.

Upon installation into the axle 202 which may be bored to accommodate a pair of axially spaced apart sleeves or liners 282 disposed about the trailer spindle 212, a groove weld 292 is disposed between the end surface 206 of the vehicle axle 202 and the oblique surface 266 of the collar 262 of the annular seal ring 214. Also, one, a pair of horizontally opposed, i.e., located at 9:00 o'clock and 3:00 o'clock, or a plurality of plug welds 294, one of which is illustrated in FIG. 6, extend through the axle 202 and into one of the sleeves or liners 282 to further secure the spindle assembly 210 into the vehicle axle 202.

Figure 9:
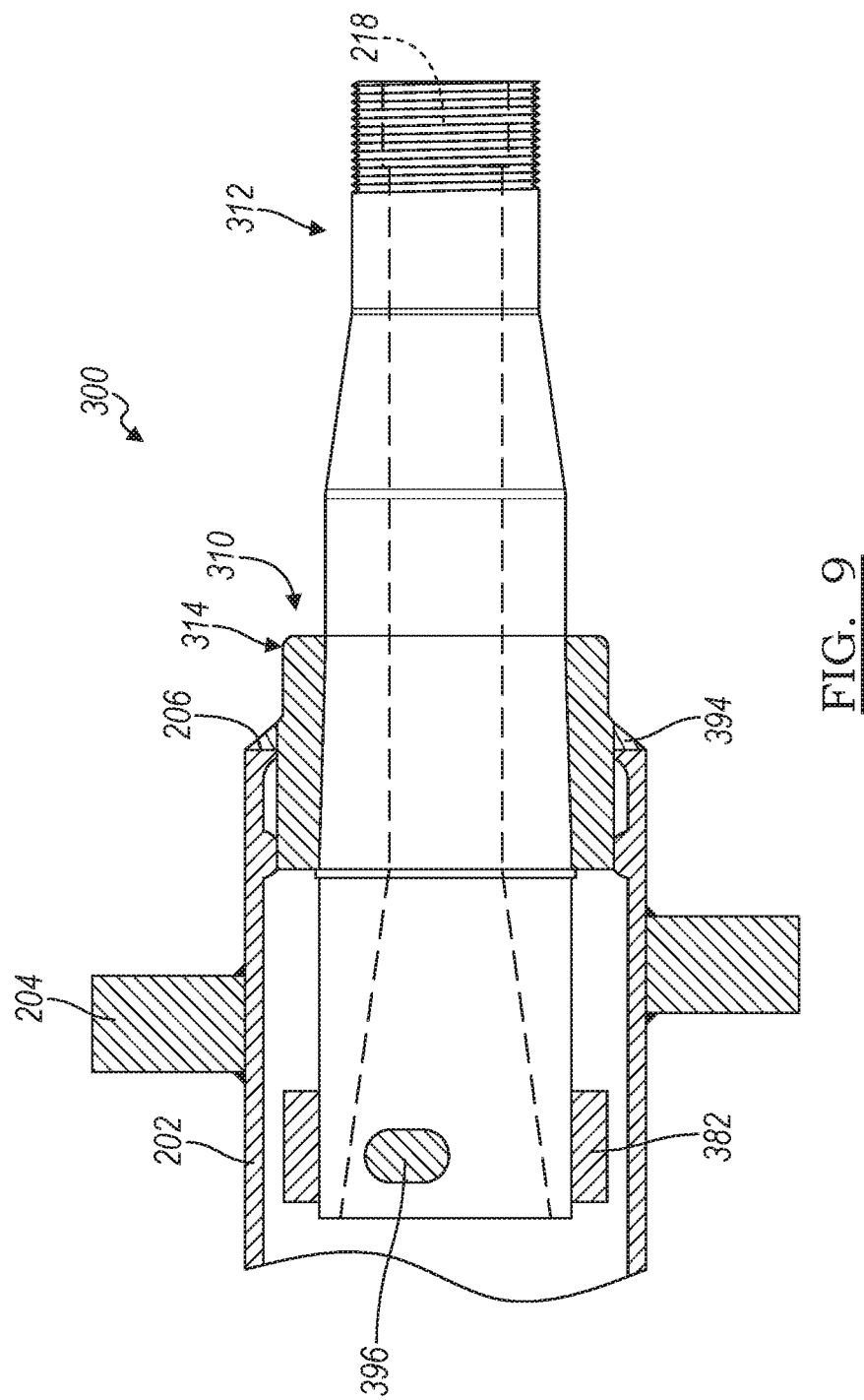
FIG. 9 is a full, sectional view of a fourth embodiment of a replacement spindle, seal ring and liner assembly according to the present invention mounted in an axle.

Referring now to FIG. 9, a fourth embodiment of a replacement spindle assembly mounted and secured in an axle is illustrated and generally designated by the reference number 300. The axle and spindle assembly 300 includes a terminal adjacent portion of a trailer axle 202 which includes the brake spider 204 to which trailer brake components (not illustrated) are attached and a replacement spindle assembly 310. The fourth embodiment of the replacement spindle assembly 310 is generally similar to the third embodiment replacement spindle assembly 210 except that it utilizes a shorter spindle, a single liner and a fillet weld adjacent the seal ring rather than a groove weld. Once again, a worn or damaged end portion (not illustrated) of the axle 202 has been removed and an end surface 206 of the trailer axle 202 has been machined or ground to a reasonably smooth chamfered finish disposed at an angle of between approximately 20 and 25 degrees and preferably 22.5 degrees.

Figure 10:
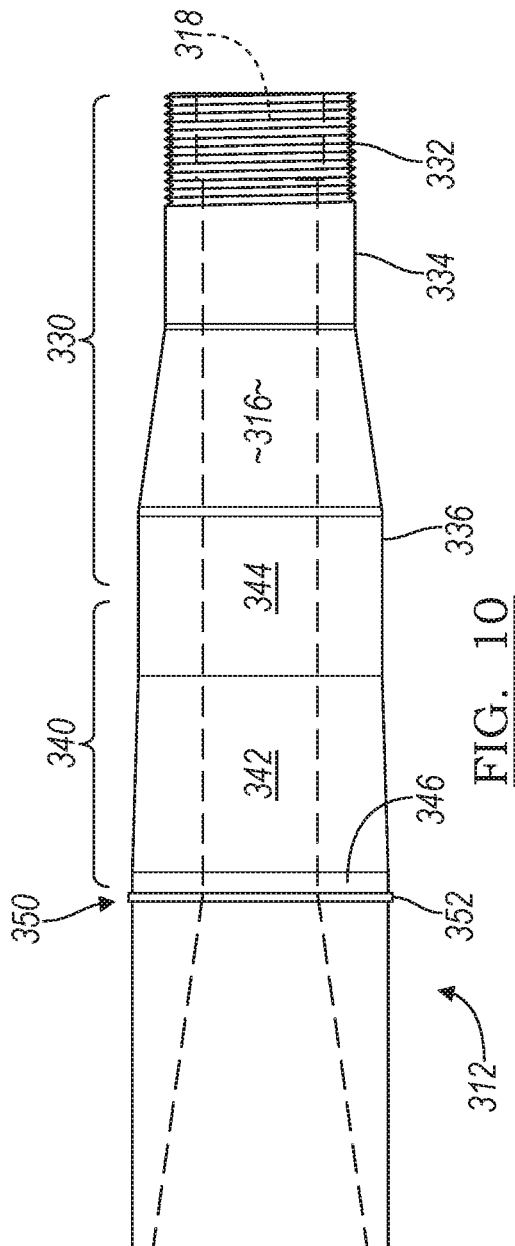
FIG. 10 is a side, elevational view of a fourth embodiment of a replacement spindle according to the present invention.
Figure 11:
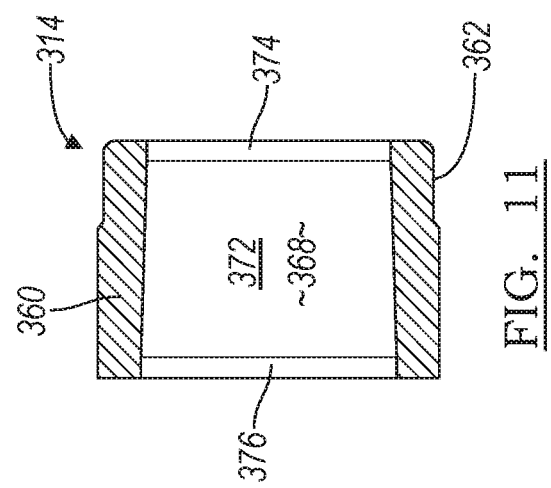
FIG. 11 is a full, sectional view of a fourth embodiment of a seal ring according to the present invention.

Referring now to FIGS. 9, 10 and 11, the fourth embodiment of the replacement spindle assembly 310 includes an elongate, cylindrical spindle 312 and an annular seal ring 314 which fits over and achieves an interference fit with the spindle 312. The fourth embodiment spindle 312, as does the first embodiment spindle 22, defines a first end portion or region 330, an intermediate portion or region 340 and a second end portion or region 350. Given considerations of weight and material savings, although the spindle 312 is typically associated with the trailer axle 202, it will preferably be fabricated with a through opening or passageway 316. In order to retain wheel bearing lubricant proximate the end of the spindle 312, a resilient, elastomeric plug 318 may be disposed in a recess at the end of the spindle 312.

The fourth embodiment spindle 312 includes a first end portion 330 having male threads 332 at its terminus, a first, outer bearing surface 334 and an axially spaced apart second, inner bearing surface 336. As stated above, while the diameter of the outer bearing surface 334 illustrated in FIGS. 9 and 10 is smaller than the diameter of the inner bearing surface 336, it should be understood that the present invention may be utilized with axle configurations having inner and outer bearing surfaces of the same diameter.

The intermediate portion or region 340 of the spindle 312 may include three distinct regions or surfaces: the frusto-conical center region or surface 342 having a first, smallest diameter at the end proximate the first end portion 330 of the spindle 312 and a second, largest diameter at the end proximate the second end portion 350 of the spindle 312. The taper amounts to between approximately 0.001 and 0.003 inches per axial inch. The frusto-conical center surface 342 smoothly merges with and may be bounded at its end proximate the first end portion 330 of the spindle 312 by a first annular surface or band 344 having a diameter equal to the smallest diameter of the frusto-conical surface 342 and at its end proximate the second end portion 350 of the spindle 312 by a second annular surface or band 346 having a diameter equal to the largest diameter of the frusto-conical center surface 342.

Again, it should be understood that the first and second annular surfaces 344 and 346 are incorporated primarily to facilitate accurate measurement of the diameters of the adjacent ends of the frusto-conical center surface 342. Thus they are optional. Moreover, the widths (axial lengths) of the surfaces 342, 344 and 346 may vary widely. For example, and notwithstanding the configuration of the third embodiment spindle 312 illustrated in FIG. 10, one or both of the surfaces 344 and 346, if included, may occupy greater axial length, with the frusto-conical center surface 342 occupying a smaller (narrower) center region or vice versa.

The second annular surface 346 is adjacent the second end portion or region 350 of the spindle 312 and may include a shoulder of flange 352. If included, the shoulder or flange 352 preferably extends fully (circumferentially) around the spindle 312 and acts as an axial stop or translation limit for the annular seal ring 314.

Referring now to FIGS. 9 and 11, the annular seal ring 314 defines a short annular or cylindrical body 360 having a reduced diameter region or inset shoulder 362 at one end. The reduced diameter region or inset shoulder 362 of the seal ring 314, as noted above, provides an oil seal surface which is contacted by an elastomeric seal (not illustrated) disposed on the wheel hub (also not illustrated) which seals in lubricant and seals out contaminants and foreign matter. The annular seal ring 314 includes a through opening 368 which may define a three region surface which is complementary to the intermediate portion or region 340 of the spindle 312. As such, it includes a tapered or frusto-conical center region or surface 372 having its smallest diameter region proximate the reduced diameter region 362 of the seal ring 314 and its largest diameter region distant the reduced diameter region 362.

At the end of the frusto-conical center region or surface 372 proximate the reduced diameter region 362 of the seal ring 314 may be a first, smaller annulus or band 374 of constant diameter having the same diameter as the adjacent smallest diameter region of the frusto-conical center region or surface 372. At the end of the frusto-conical center region or surface 372 distant the reduced diameter region 362 may be a second, larger annulus or band 376 of constant diameter having the same diameter as the adjacent largest diameter region of the frusto-conical center region or surface 372. Again, in FIG. 11, the angle of the taper of the frusto-conical center surface 372 has been enhanced to improve the clarity of and facilitate understanding of this feature of the invention. The axial length of the center surface 372, its taper angle and the axial lengths of the annuli or bands 374 and 376 are identical to the axial length and taper angle of the center surface 342 of the spindle 312 and the axial lengths of the annular surfaces 344 and 346 such that the respective surfaces align when the annular seal ring 314 is positioned on the spindle 312. Note once again, that the second annulus or band 376 is both narrower than, for example, the first embodiment seal ring annulus 70 and that it is the same width as the second annular surface or band 346 on the spindle 312.

Again, it should be appreciated that the first and second annuli 374 and 376 are included primarily to facilitate accurate measurement of the diameters of the adjacent ends of the frusto-conical center surface 372 and thus that they are optional. Furthermore, the relative widths (axial lengths) of the center surface 372 and the first and second annuli 374 and 376 may vary widely, but must, of course, be identical, respectively, to the widths (axial lengths) of the frusto-conical surface 342 and the annular surfaces 344 and 346 of the spindle 312. For example, and notwithstanding the configuration of the seal ring 314 illustrated in FIG. 11, if included, one or both of the annuli 374 and 376 may occupy greater axial length, with the frusto-conical center surface 372 occupying a smaller (narrower) center region or vice versa.

In order to achieve a suitable interference fit after heating and assembly, the frusto-conical center surface 372 and the first and second annuli 374 and 376 of the seal ring 314 will typically and preferably define diameters between approximately 0.004 and 0.006 inches smaller than their complementary (mating) frusto-conical surface 342 and the annular surfaces 344 and 346 of the trailer spindle 312, or, stated oppositely, the frusto-conical surface 342 and the annular surfaces 344 and 346 of the trailer spindle 312 will typically and preferably define diameters between approximately 0.004 and 0.006 inches larger than the frusto-conical surface 372 and the first and second annuli 374 and 376 of the annular seal ring 314 before assembly.

Upon installation into the axle 202 which may be bored to accommodate a single sleeve or liner 382 disposed about the spindle 312, a fillet weld 394 is disposed between the end surface 206 of the vehicle axle 202 and the outer surface of the seal ring 314 adjacent the region 362. Also, one, a pair of horizontally opposed, i.e., located at 9:00 o'clock and 3:00 o'clock, or a plurality of plug welds 396, one of which is illustrated in FIG. 9, extend through the vehicle axle 202 and into the sleeve or liner 382 to further secure the spindle assembly 310 into the vehicle axle 202.

A brief description of the assembly and installation of the replacement spindle assemblies 20, 110, 210 and 310 described herein follows. As stated previously, the repair procedure commences with the removal of a damaged or worn portion of a tractor or trailer axle (not illustrated) which will typically include either or both of the threaded end and bearing surfaces. The end of the axle such as the axle 12, 102 or 202 illustrated in FIGS. 1, 4, 6 and 9 is then trimmed, machined or ground to a chamfered surface having an angle of approximately 22.5 degrees or slightly more or less. Openings for the plug welds may be made at this time. The correct replacement tractor or trailer spindle, the seal ring and liner(s), if necessary, are selected. The seal ring 24, 112, 214 or 314 is then uniformly heated with a propane or similar torch to several hundred degrees Fahrenheit.

So heated and having enlarged several thousandths of an inch in diameter, the seal ring 24, 112, 214 or 314 may readily be placed on the end of the associated spindle 22, 212 or 312 and slid or translated until the complementary pairs of frusto-conical surfaces 42 and 66 or 132, 242 and 272 and 342 and 372 align. If the spindle 22, 212 or 312 includes the flange or shoulder 52, 142, 252 or 352, the seal ring 24, 112, 214 or 314 may be slid axially on the spindle 22, 212 or 312 until it engages the flange or shoulder 52, 142, 252 or 352. At this juncture, these components are properly assembled and all that remains is the insertion of the replacement spindle assembly 20, 110, 210 or 310 into the axle 12, 102 or 202 and the application of appropriate circular welds 78, 142, 292 or 394 and weld plugs 82, 144, 294 or 396 between the spindle assembly and the vehicle axle.

Figure 12:
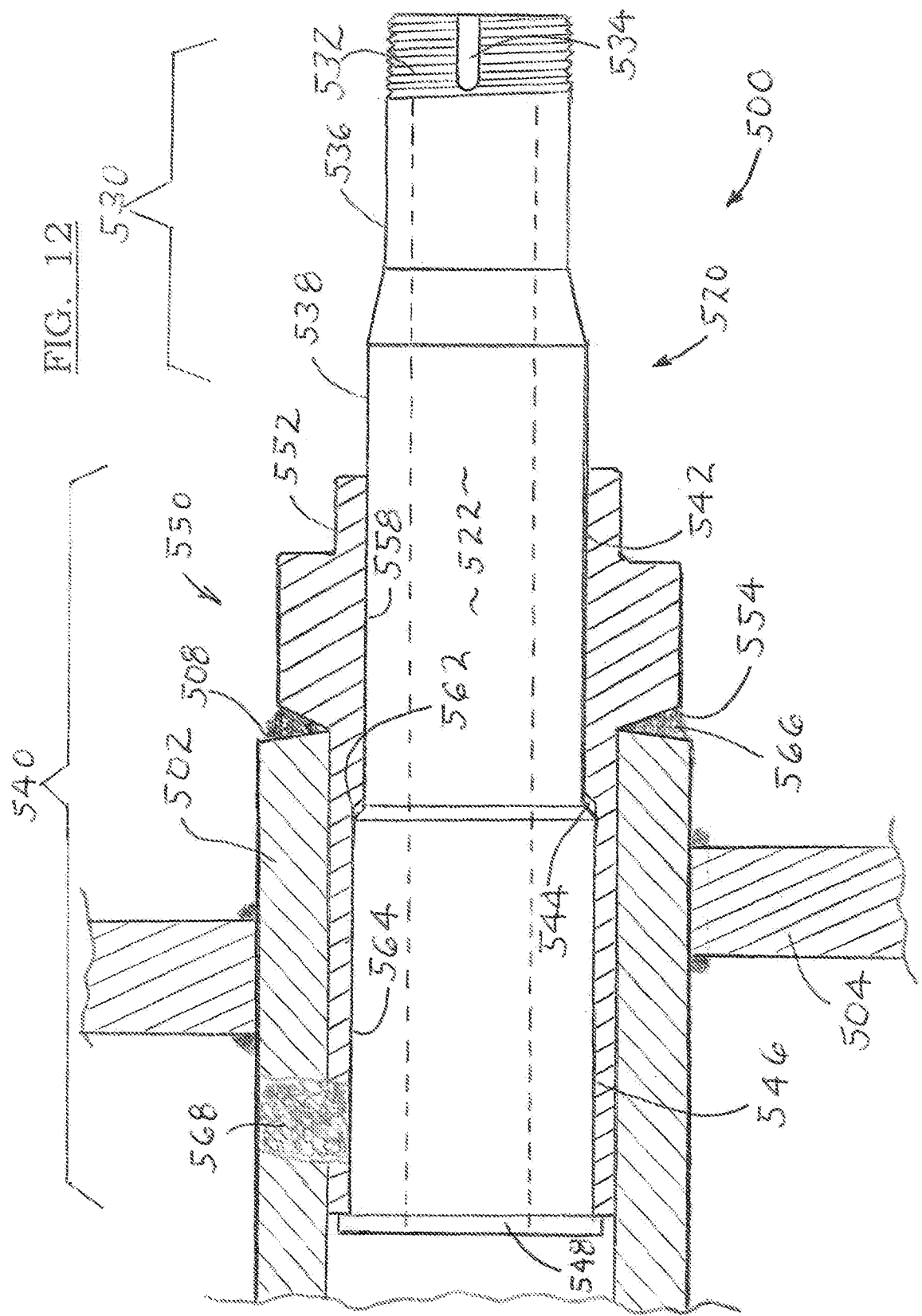
FIG. 12 is a full, sectional view of a fifth embodiment of a replacement spindle and seal ring assembly according to the present invention mounted in an axle.

Referring now to FIG. 12 a fifth embodiment of a replacement spindle and seal ring assembly is designated by the reference number 500. The replacement spindle and seal ring assembly 500 includes an elongate, cylindrical spindle 520 and a cylindrical seal ring 550 which fits on and achieves an interference fit with the spindle 520.

At the outset, it should be noted and understood that there are several differences between the fifth embodiment 500 (and a sixth embodiment 600) and those four embodiments 20, 100, 200, 300 described supra. Note, for example, in FIGS. 1 and 4 there is a circumferential projection or ring (not numbered) on the interior wall of the axles 12 and 102. This is an artifact of the spin welded assembly of a terminal portion of the axle to the main bodies of the axles 12 and 102. In the fifth embodiment 500 (and the sixth embodiment 600), a worn or damaged portion of an axle 502 has been removed between a brake flange 504 and the spin welded projection or ring (not illustrated) such that the projection or ring is also removed. The end of the axle 502 is then machined or ground to a reasonably smooth chamfered surface 508, having an angle of between approximately 20 to 25 degrees to the axis of the axle 502, and preferably 22.5 degrees.

Additionally, whereas in the first through fourth embodiments 20, 100, 200, 300, the interference fit is achieved along essentially the full length of the interior of the seal ring 24, 112, 214 and 314, including the frusto-conical center region, in the fifth embodiment 500 (and the sixth embodiment 600) the intermediate frusto-conical regions are defined by discrete oblique steps or shoulders which do not contact. Rather, a shoulder or annulus 548 on the inner end of the spindle 520 acts as a positive stop to limit axial travel and positively locate the cylindrical seal ring 550 on the elongate spindle 520.

Accordingly, the elongate spindle 520 defines a first (outer) end portion or region 530 and a second (inner) end portion or region 540. The elongate spindle 520 is preferably, though not necessarily, hollow and defines a through axial opening or passageway 522. Such an opening or passageway 522 is advantageous in that it achieves significant weight reduction relative to a solid spindle. Moreover, if the axle 502 is a drive axle of a tractor, it will necessarily be hollow to receive a drive shaft (not illustrated).

The first end portion or region 530 include male threads 532 at its terminus, an axially extending keyway 534, a first, outer bearing surface 536 and an axially spaced apart second, inner bearing surface 538. Generally speaking, and as illustrated in FIG. 12, the diameter of the outer bearing surface 536 is smaller than the diameter of the inner bearing surface 538. Certain axles, however, have inner and outer bearing surfaces of the same diameter and it should be understood that the present invention is equally suitable for use with both configurations.

The second (inner) end portion or region 540 of the spindle 520 extends and includes, a first smaller diameter region 542 which is the same diameter as the inner bearing surface 538, to a discrete, frusto-conical step or shoulder 544. The second (inner) end portion or region 540 then defines a second, larger diameter region 546 which extends to a circumferential annulus, flange or shoulder 548 at the inner terminus of the spindle 520.

The cylindrical seal ring 550 includes an exterior oil seal surface 552 and a frusto-conical surface 554 preferably oriented at an angle of approximately 22.5 degrees to the axis of the axle 502. The cylindrical seal ring 550 includes a through opening defined by a first, smaller diameter portion or region 558 proximate the oil seal surface 552, a discrete, frusto-conical step or shoulder 562 and a second, larger diameter portion or region 564. The interference fit between the spindle 520 and the seal ring 550 is achieved by manufacturing the regions 542 and 546 of the spindle 520 to be approximately 0.001 inch to 0.0015 inch per inch of diameter of the spindle 520 larger than the corresponding regions 558 and 564 of the seal ring 550 or vice versa.

Installation is begun by heating the seal ring 550 to several hundred degrees Fahrenheit and sliding the seal ring onto the spindle 520 until the seal ring 550 contacts the annulus or shoulder 548. The assembly is then inserted into the axle 502 with the surfaces 508 and 554 facing one another and the resulting groove is filled with weld material 566. Finally, plug welds 568 are placed through the axle 502 and into the seal ring 550 behind the brake flange 504 preferably at 10:00 o'clock and 2:00 o'clock positions.

Figure 13:
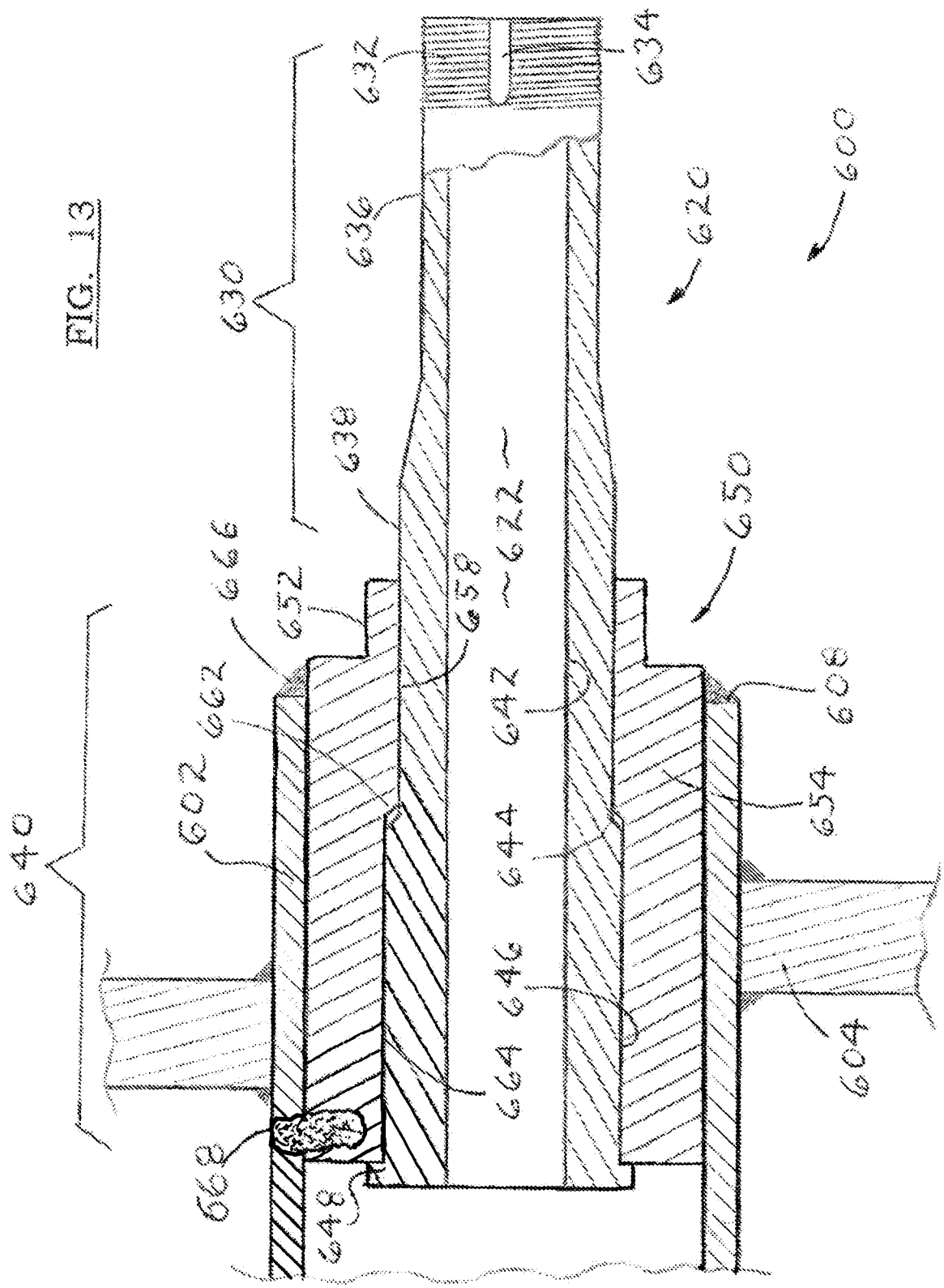
FIG. 13 a substantially full, sectional view of sixth embodiment of a replacement spindle and seal ring assembly according to the present invention mounted in an axle.

Referring now to FIG. 13, a sixth embodiment of a replacement spindle and seal ring assembly is designated by the reference number 600. The replacement spindle and seal ring assembly 600 includes an elongate, cylindrical spindle 620 and a cylindrical seal ring 650 which fits on and achieves an interference fit with the spindle 620. Here, the end surface 608 of the axle 604 is machined or ground to be substantially perpendicular to the axis of the axle 604.

The elongate spindle 620 defines a first (outer) end portion or region 630 and a second (inner) end portion or region 640. The elongate spindle 620 is preferably, though not necessarily, hollow and defines a through axial opening or passageway 622.

The first end portion or region 630 include male threads 632 at its terminus, an axially extending keyway 634, a first, outer bearing surface 636 and an axially spaced apart second, inner bearing surface 638. As noted above, certain axles have inner and outer bearing surfaces of the same diameter and it should be understood that the present invention is equally suitable for use with both configurations.

The second (inner) end portion or region 640 of the spindle 620 extends and includes, a first smaller diameter region 642 which is the same diameter as the inner bearing surface 658, to a discrete, frusto-conical step or shoulder 644. The second (inner) end portion or region 640 then defines a second, larger diameter region 646 which extends to a circumferential annulus, flange or shoulder 648 at the inner terminus of the spindle 620.

The cylindrical seal ring 650 includes an exterior oil seal surface 652 and a cylindrical body 654 having a constant outside diameter. The cylindrical seal ring 650 includes a through opening defined by a first, smaller diameter portion or region 658 proximate the oil seal surface 652, a discrete, frusto-conical step or shoulder 662 and a second, larger diameter portion or region 664. The interference fit between the spindle 620 and the seal ring 650 is achieved by manufacturing the regions 642 and 646 of the spindle 620 to be approximately 0.001 inch to 0.0015 inch per inch of diameter of the spindle 620 larger than the corresponding regions 658 and 664 of the seal ring 650 or vice versa. With an axle diameter of approximately five inches, a suitable interference fit will be on the order of 0.004 to 0.007 inches.

Installation is achieved by first heating the seal ring 650 to several hundred degrees Fahrenheit and sliding the seal ring 650 onto the spindle 620 until the seal ring 650 contacts the annulus or shoulder 648. The assembly is then inserted into the axle 602 and a fillet weld 666 is placed in the corner formed by the end surface 608 of the axle 602 and the outside surface of the seal ring 650. Finally, plug welds 668 are placed through the axle 602 and into the seal ring 650 behind the brake flange 604 preferably at 10:00 o'clock and 2:00 o'clock positions.

The description of the invention is merely exemplary in nature and variations that do not depart from the gist of the invention are intended to be within the scope of the invention. Such variations are not to be regarded as a departure from the spirit and scope of the invention.

What is claimed is:

1. A replacement spindle assembly for a vehicle axle, comprising, in combination,
    an elongate, tubular spindle having a first end portion, a second end portion and a through internal passageway,
    said first end portion of said spindle having a first bearing region adapted to receive a first bearing assembly, a second bearing region having a diameter, spaced from said first bearing region and adapted to receive a second bearing assembly, and a threaded region adjacent said first bearing region having male threads,
    said second end portion of said spindle defining an end adapted to be received within the vehicle axle and having a first region having a diameter equal to said diameter of said second bearing region of said first end portion, a second region having a diameter larger than said diameter of said first region and terminating in a flange and a first oblique shoulder between said first and second regions, and a cylindrical seal ring for disposition on said elongate, tubular spindle by an interference fit, said seal ring defining a first, smaller inside diameter and a second, larger inside diameter larger than the first, smaller inside diameter; the first, smaller inside diameter and the second, larger inside diameter separated by a second oblique shoulder, both said smaller and said larger diameters of said seal ring being smaller than respective said first and second regions of said spindle.

2. The replacement spindle assembly of claim 1 wherein said first end portion of said spindle includes a keyway in said threads.

3. The replacement spindle assembly of claim 1 wherein said through passageway of said spindle is of constant diameter.

4. The replacement spindle assembly of claim 1 further including a groove weld between a chamfered surface of the vehicle axle and an oblique surface of said cylindrical seal ring.

5. The replacement spindle assembly of claim 1 wherein said first and second oblique shoulders are not in contact when said seal ring is slid into contact with said flange on said second end portion of said spindle.

6. The replacement spindle assembly of claim 1 wherein said cylindrical seal ring includes a chamfered surface oriented at an angle of between 20 and 25 degrees.

7. The replacement spindle assembly of claim 1 further including at least one plug weld disposed in an opening in said axle between said axle and said seal ring.

8. A replacement spindle assembly for a vehicle axle, comprising, in combination, a cylindrical spindle having a first end portion, a second end portion and an axial through passageway, said first end portion of said spindle having an outer bearing surface adapted to receive an outer bearing assembly, an inner bearing surface axially spaced from said outer bearing surface, having a diameter and adapted to receive an inner bearing assembly, and a threaded region adjacent said outer bearing surface having male threads, said second end portion of said spindle defining an end adapted to be received within the vehicle axle and having a first region having a diameter equal to said diameter of the inner bearing surface of said first end portion, a second region having a diameter larger than said diameter of said first region and terminating in a flange and a first oblique surface between said first and second regions, and a cylindrical ring for disposition on said cylindrical spindle, said cylindrical ring having an external feature and defining a first region of a first, smaller diameter, a second region of a second, larger diameter, the second region of the second, larger diameter having a diameter greater than the first region of the first smaller diameter, and a second oblique surface between said first and second regions of said cylindrical ring, both said first and second regions of said cylindrical ring having diameters smaller than said respective first and second regions of said second end portion of said spindle, wherein an interference fit secures said cylindrical ring to said spindle.

9. The replacement spindle assembly of claim 8 wherein said external feature of said cylindrical ring includes an oil seal surface with a diameter smaller than an outside diameter of said cylindrical ring.

10. The replacement spindle assembly of claim 8 wherein said first and second oblique surfaces are not in contact when a seal ring is slid into contact with said flange on said second end portion of said spindle.

11. The replacement spindle assembly of claim 8 wherein said first end portion of said spindle includes a keyway in said threads.

12. The replacement spindle assembly of claim 8 wherein said cylindrical ring includes a frusto-conical surface oriented at an angle of between 20 and 25 degrees.

13. The replacement spindle assembly of claim 8 further including at least one plug weld disposed proximate said second end portion of said spindle and behind a brake flange and extending through the vehicle axle and into said cylindrical ring.

14. A replacement spindle assembly for a vehicle axle, comprising, in combination, an elongate spindle having a first end region, a second end region and a through passageway, said first end region having a first bearing surface adapted to receive a first bearing assembly, a second bearing surface spaced from said first bearing surface and adapted to receive a second bearing assembly, and male threads adjacent said first bearing surface, said second end region having an end adapted to be received within said vehicle axle and having a first portion having a diameter equal to said diameter of said second bearing surface of said first end region, a second portion having a diameter larger than said diameter of said first portion and terminating in a flange and a first frusto-conical surface between said first and second portions of said second end region, and an annular seal ring adapted to be assembled on said spindle by an interference fit, said annular seal ring having an opening having a first portion of a first, smaller diameter, a second portion of a second, larger diameter, the second portion of the second, larger diameter having a diameter greater than the first portion of the first, smaller diameter, and a second frusto-conical surface between said first and second portions of said opening of said annular ring, whereby both said first and second portions of said opening of said annular seal ring are smaller than said respective first and second portions of said second end region of said spindle before assembly.

15. The replacement spindle assembly of claim 14 wherein said first and second frusto-conical surfaces are not in contact when said annular seal ring is slid into contact with said flange on said second end region of said spindle.

16. The replacement spindle assembly of claim 14 said first end portion of said spindle includes a keyway in said male threads.

17. The replacement spindle assembly of claim 14 wherein an exterior feature of said seal ring includes an oil seal surface having a diameter different from an outside diameter of said seal ring.

18. The replacement spindle assembly of claim 14 wherein said annular seal ring includes a frusto-conical surface oriented at an angle of between 20 and 25 degrees.

19. The replacement spindle assembly of claim 14 further including at least one plug weld disposed in an opening in said vehicle axle between said axle and said seal ring.

* * * * *